(12) United States Patent
Trujillo, II et al.

(10) Patent No.: US 12,224,570 B2
(45) Date of Patent: Feb. 11, 2025

(54) UNIBRACKET SYSTEMS

(71) Applicant: Evergreen Innovation Group, LLC, Sacramento, CA (US)

(72) Inventors: Rudy Trujillo, II, Goodyear, AZ (US); Stephen Patrick Kelleher, Phoenix, AZ (US)

(73) Assignee: Evergreen Innovation Group, LLC, Sacramento, CA (US)

( * ) Notice: Subject to any disclaimer, the term of this patent is extended or adjusted under 35 U.S.C. 154(b) by 294 days.

(21) Appl. No.: 17/727,646

(22) Filed: Apr. 22, 2022

(65) Prior Publication Data
US 2023/0344208 A1 Oct. 26, 2023

(51) Int. Cl.
*H02G 3/12* (2006.01)
*H02G 3/10* (2006.01)

(52) U.S. Cl.
CPC .............. *H02G 3/125* (2013.01); *H02G 3/10* (2013.01); *H02G 3/12* (2013.01)

(58) Field of Classification Search
CPC .......... H02G 3/125; H02G 3/08; H02G 3/081; H02G 3/083; H02G 3/12; H02G 3/10; Y10S 248/906; E04B 9/06
See application file for complete search history.

(56) References Cited

U.S. PATENT DOCUMENTS

| | | | | |
|---|---|---|---|---|
| 1,288,024 A | * | 12/1918 | Kendig | H02G 3/125 |
| | | | | 220/3.9 |
| 1,683,308 A | * | 9/1928 | Scranton | H02G 3/126 |
| | | | | 220/3.9 |
| 4,757,967 A | * | 7/1988 | Delmore | H02G 3/126 |
| | | | | 248/27.1 |
| 5,114,105 A | | 5/1992 | Young | |
| 5,516,068 A | * | 5/1996 | Rice | E04B 9/006 |
| | | | | 248/300 |

(Continued)

OTHER PUBLICATIONS

"nVent—A1BF3GD3NS—All-In-One Between-Stud With Removable Mud Ring," Neobits.com, (Accessed Jan. 31, 2022), <URL:https://www.neobits.com/nvent_a1bf3gd3ns_all_in_one_between_stud_with_p12682529.html?atc=gbp&gclid=Cj0KCQlArt6PBhCoARIsAMF5waj_SE8ZDu7RmpsLxlk0T1Td7uZLtTXeblZrqgAOVD45YwCdoBz_KpcaAgzCEALw_wcB>, 3 pages.

(Continued)

*Primary Examiner* — Nkeisha Smith
(74) *Attorney, Agent, or Firm* — Carr & Ferrell LLP

(57) ABSTRACT

The present disclosure relates to a unibracket assembly system. For example is some embodiments, a single prefabricated unibracket assembly system for connecting electrical boxes in a wall, the single prefabricated unibracket assembly system including: a prefabricated unibracket single-piece frame being prefabricated for installation, the prefabricated unibracket single-piece frame including: a top frame member, the top frame member including a plurality of top fastening slots along a horizontal length of the top frame member for adjustably installing a plurality of devices and adjustable anchoring to wall studs, the plurality of top fastening slots including a left top fastening slot for attaching the prefabricated unibracket single-piece frame to a left wall stud or a device and a right top fastening slot for attaching the prefabricated unibracket single-piece frame to a right wall stud or a device.

20 Claims, 7 Drawing Sheets

(56) References Cited

U.S. PATENT DOCUMENTS

| | | | | |
|---|---|---|---|---|
| 5,931,425 | A * | 8/1999 | Oliva | H02G 3/125 |
| | | | | 33/528 |
| 6,590,155 | B2 * | 7/2003 | Vrame | H02G 3/123 |
| | | | | 174/64 |
| 6,803,521 | B2 * | 10/2004 | Vrame | H02G 3/123 |
| | | | | 439/535 |
| 7,271,335 | B2 * | 9/2007 | Dinh | H02G 3/125 |
| | | | | 174/53 |
| 7,521,631 | B2 | 4/2009 | Dinh | |
| 7,572,977 | B2 | 8/2009 | Gorman | |
| 7,595,447 | B2 * | 9/2009 | Vrame | H01R 13/518 |
| | | | | 174/57 |
| 8,378,213 | B1 * | 2/2013 | Gerardo | H02G 1/00 |
| | | | | 174/57 |
| 9,397,491 | B2 | 7/2016 | Birli et al. | |
| 9,825,446 | B2 * | 11/2017 | Korcz | H02G 3/125 |
| 10,405,676 | B1 * | 9/2019 | Underwood | A47F 5/0846 |
| 10,711,940 | B2 | 7/2020 | Witherbee | |
| 10,784,666 | B2 * | 9/2020 | Korcz | H02G 3/126 |
| 10,851,937 | B2 * | 12/2020 | Johnson | F16M 13/02 |
| 11,076,709 | B2 * | 8/2021 | Gillespie | F16B 5/0056 |
| 11,473,721 | B2 * | 10/2022 | Oh | F16M 13/022 |
| 11,585,486 | B2 * | 2/2023 | Witherbee | F16M 13/022 |
| 2005/0176278 | A1 * | 8/2005 | Cheatham | H02G 3/086 |
| | | | | 439/92 |
| 2010/0006723 | A1 | 1/2010 | Yan | |
| 2016/0087416 | A1 | 3/2016 | Vrame | |
| 2016/0099555 | A1 * | 4/2016 | Nikayin | H02G 3/126 |
| | | | | 248/65 |
| 2022/0030731 | A1 * | 1/2022 | Oh | H05K 7/14 |
| 2023/0378730 | A1 * | 11/2023 | Witherbee | H02G 3/126 |
| 2024/0079865 | A1 * | 3/2024 | Beristany | H02G 3/083 |

OTHER PUBLICATIONS

"Caddy All-In-One Between-Stud With Mud Ring—Multi-Box—4 Inch Box—2 Gang—W/G—5 Inch Box—1 Gang—No G—5/8 Inch Dry wall—3-5/8 Inch (A1BF2G51N)" LightingSupply.com, (Accessed Jan. 31, 2022); <URL:https://www.lightingsupply.com/caddy-a1bf2g51n.aspx?gclid=Cj0KCQlArt6PBhCoARIsAMF5wagz1sN5jVSPw6QyoLVDbghj2_ZVRUGE0jqbZ4g-Nd_3J6B5LjCD68saAuljEALw_wcB>, 3 pages.

\* cited by examiner

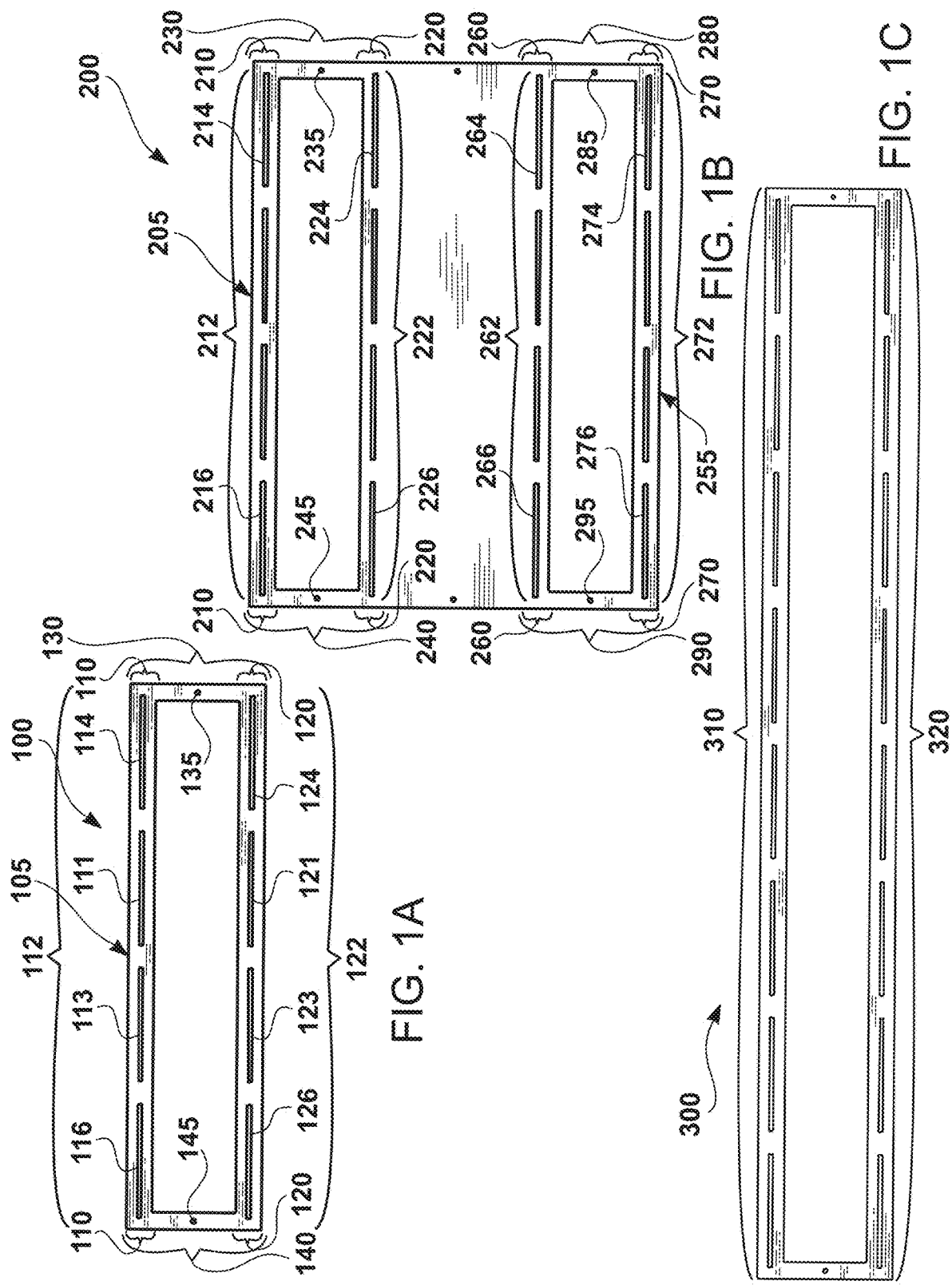

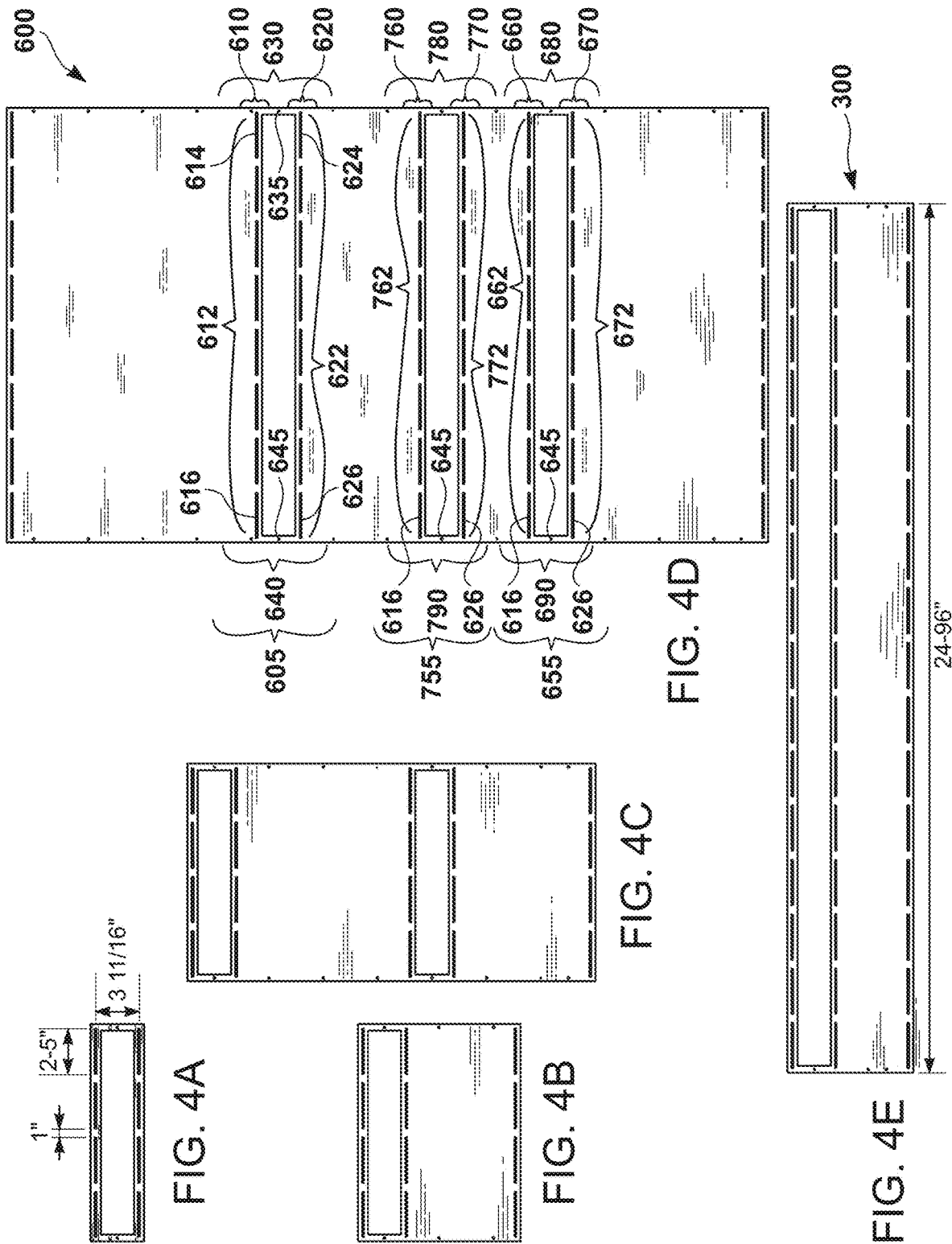

UNIBRACKET SYSTEMS

FIELD OF TECHNOLOGY

Embodiments of the present disclosure are directed to prefabricated unibracket assembly systems. In various embodiments the prefabricated unibracket assembly systems are for connecting electrical boxes in a wall.

SUMMARY

In some aspects, the techniques described herein relate to a single prefabricated unibracket assembly system for connecting electrical boxes in a wall, the single prefabricated unibracket assembly system including: a prefabricated unibracket single-piece frame being prefabricated for installation, the prefabricated unibracket single-piece frame including: a top frame member, the top frame member including a plurality of top fastening slots along a horizontal length of the top frame member for adjustably installing a plurality of devices and adjustable anchoring to wall studs, the plurality of top fastening slots including a left top fastening slot for attaching the prefabricated unibracket single-piece frame to a left wall stud or a device and a right top fastening slot for attaching the prefabricated unibracket single-piece frame to a right wall stud or a device; a bottom frame member, the bottom frame member including a plurality of bottom fastening slots along a horizontal length of the bottom frame member for adjustably installing the plurality of devices and adjustable anchoring to wall studs, the plurality of bottom fastening slots including a left bottom fastening slot for attaching the prefabricated unibracket single-piece frame to a left wall stud or a device and a right bottom fastening slot for attaching the prefabricated unibracket single-piece frame to a right wall stud or a device; a left frame member, the left frame member including a left installation hole for attaching to a left wall stud; and a right frame member, the right frame member including a right installation hole for attaching to a right wall stud; wherein the plurality of top fastening slots and the plurality of bottom fastening slots allow for adjustable placement of the plurality of devices along the prefabricated unibracket single-piece frame and for adjustable anchoring of the prefabricated unibracket single-piece frame to wall studs.

In some aspects, the techniques described herein relate to a system, wherein the plurality of top fastening slots further include a left middle top fastening slot and a right middle top fastening slot; wherein the plurality of bottom fastening slots further include a left middle bottom fastening slot and a right middle bottom fastening slot.

In some aspects, the techniques described herein relate to a system, wherein a vertical distance between the plurality of top fastening slots and the plurality of bottom fastening slots is three and eleven sixteenths inches.

In some aspects, the techniques described herein relate to a system, wherein a horizontal length between each of the plurality of top fastening slots along the horizontal length of the top frame member and a horizontal length between each of the plurality of bottom fastening slots along the horizontal length of the bottom frame member is one inch.

In some aspects, the techniques described herein relate to a system, wherein a horizontal length of each of the plurality of top fastening slots along the horizontal length of the top frame member and a horizontal length of each of the plurality of top fastening slots along the horizontal length of the top frame member is between two inches and five inches.

In some aspects, the techniques described herein relate to a system, wherein a horizontal length of each of the plurality of top fastening slots along the horizontal length of the top frame member and a horizontal length of each of the plurality of top fastening slots along the horizontal length of the top frame member is greater than five inches.

In some aspects, the techniques described herein relate to a system, wherein a horizontal length of the top frame member and the bottom frame member is between twenty-four inches and ninety-six inches.

In some aspects, the techniques described herein relate to a system, wherein the prefabricated unibracket single-piece frame is a wide frame, the wide frame being wherein a horizontal length of both the top frame member and the bottom frame member is between twenty-four inches and ninety-six inches.

In some aspects, the techniques described herein relate to a system, wherein at least one of the plurality of top fastening slots are anchored to a middle wall anchor, the middle wall anchor being between the left wall stud and the right wall stud; wherein at least one of the plurality of bottom fastening slots are anchored to the middle wall anchor, the middle wall anchor being between the left wall stud and the right wall stud.

In some aspects, the techniques described herein relate to a system, wherein the plurality of devices includes two devices.

In some aspects, the techniques described herein relate to a system, wherein the plurality of devices includes three devices.

In some aspects, the techniques described herein relate to a system, wherein the plurality of devices includes four devices.

In some aspects, the techniques described herein relate to a system, wherein the prefabricated unibracket single-piece frame further includes backing, the backing being prefabricated and integrated with the unibracket single-piece frame.

In some aspects, the techniques described herein relate to a double prefabricated unibracket assembly system for connecting electrical boxes in a wall, the double prefabricated unibracket assembly system including: an upper prefabricated unibracket single-piece frame being prefabricated for installation, the upper prefabricated unibracket single-piece frame including: an upper top frame member, the upper top frame member including a plurality of upper top fastening slots along a horizontal length of the upper top frame member for adjustably installing a upper plurality of devices and adjustable anchoring to wall studs, the plurality of upper top fastening slots including a left top fastening slot for attaching the upper prefabricated unibracket single-piece frame to a left wall stud or a device and a right top fastening slot for attaching the upper prefabricated unibracket single-piece frame to a right wall stud or a device; an upper bottom frame member, the upper bottom frame member including a plurality of upper bottom fastening slots along a horizontal length of the upper bottom frame member for adjustably installing the upper plurality of devices and adjustable anchoring to wall studs, the plurality of upper bottom fastening slots including a left bottom fastening slot for attaching the upper prefabricated unibracket single-piece frame to a left wall stud or a device and a right bottom fastening slot for attaching the upper prefabricated unibracket single-piece frame to a right wall stud or a device; an upper left frame member, the upper left frame member including a left installation hole for attaching to a left wall stud; and an upper right frame member, the upper right frame member including a right installation hole for attaching to a right wall stud; wherein the plurality of upper top fastening slots and the plurality of upper bottom fastening slots allow for adjustable placement of the upper plurality of devices along the upper prefabricated unibracket single-piece frame and for adjustable anchoring of the upper prefabricated unibracket single-piece frame to wall studs; a lower prefabricated unibracket single-piece frame being prefabricated for installation and being lower in a vertical direction compared to the upper prefabricated unibracket single-piece frame, the lower prefabricated unibracket single-piece frame including: a lower top frame member, the lower top frame member including a plurality of lower top fastening slots along a horizontal length of the lower top frame member for adjustably installing a lower plurality of devices and adjustable anchoring to wall studs, the plurality of lower top fastening slots including a left top fastening slot for attaching the lower prefabricated unibracket single-piece frame to a left wall stud or a device and a right top fastening slot for attaching the lower prefabricated unibracket single-piece frame to a right wall stud or a device; a lower bottom frame member, the lower bottom frame member including a plurality of bottom fastening slots along a horizontal length of the lower bottom frame member for adjustably installing the lower plurality of devices and adjustable anchoring to wall studs, the plurality of bottom fastening slots including a left bottom fastening slot for attaching the lower prefabricated unibracket single-piece frame to a left wall stud or a device and a right bottom fastening slot for attaching the lower prefabricated unibracket single-piece frame to a right wall stud or a device; a lower left frame member, the lower left frame member including a left installation hole for attaching to a left wall stud; and a lower right frame member, the lower right frame member including a right installation hole for attaching to a right wall stud; wherein the plurality of lower top fastening slots and the plurality of lower bottom fastening slots allow for adjustable placement of the lower plurality of devices along the lower prefabricated unibracket single-piece frame and for adjustable anchoring of the lower prefabricated unibracket single-piece frame to wall studs.

In some aspects, the techniques described herein relate to a system, wherein a vertical distance between the upper top frame member and the lower bottom frame member is between six inches and ninety-six inches.

In some aspects, the techniques described herein relate to a system, wherein the double prefabricated unibracket assembly system further includes backing, the backing being prefabricated and integrated with the unibracket single-piece frame.

In some aspects, the techniques described herein relate to a full wall prefabricated unibracket assembly system for connecting electrical boxes in a wall, the full wall prefabricated unibracket assembly system including: an upper prefabricated unibracket single-piece frame being prefabricated for installation, the upper prefabricated unibracket single-piece frame including: an upper top frame member, the upper top frame member including a plurality of upper top fastening slots along a horizontal length of the upper top frame member for adjustably installing a upper plurality of devices and adjustable anchoring to wall studs, the plurality of upper top fastening slots including a left top fastening slot for attaching the upper prefabricated unibracket single-piece frame to a left wall stud or a device and a right top fastening slot for attaching the upper prefabricated unibracket single-piece frame to a right wall stud or a device; an upper bottom frame member, the upper bottom frame member including a plurality of upper bottom fastening slots along a horizontal length of the upper bottom frame member for adjustably installing the upper plurality of devices and adjustable anchoring to wall studs, the plurality of upper bottom fastening slots including a left bottom fastening slot for attaching the upper prefabricated unibracket single-piece frame to a left wall stud or a device and a right bottom fastening slot for attaching the upper prefabricated unibracket single-piece frame to a right wall stud or a device; an upper left frame member, the upper left frame member including a left installation hole for attaching to a left wall stud; and an upper right frame member, the upper right frame member including a right installation hole for attaching to a right wall stud; wherein the plurality of upper top fastening slots and the plurality of upper bottom fastening slots allow for adjustable placement of the upper plurality of devices along the upper prefabricated unibracket single-piece frame and for adjustable anchoring of the upper prefabricated unibracket single-piece frame to wall studs; a lower prefabricated unibracket single-piece frame being prefabricated for installation and being lower in a vertical direction compared to the upper prefabricated unibracket single-piece frame, the lower prefabricated unibracket single-piece frame including: a lower top frame member, the lower top frame member including a plurality of lower top fastening slots along a horizontal length of the lower top frame member for adjustably installing a lower plurality of devices and adjustable anchoring to wall studs, the plurality of lower top fastening slots including a left top fastening slot for attaching the lower prefabricated unibracket single-piece frame to a left wall stud or a device and a right top fastening slot for attaching the lower prefabricated unibracket single-piece frame to a right wall stud or a device; a lower bottom frame member, the lower bottom frame member including a plurality of bottom fastening slots along a horizontal length of the lower bottom frame member for adjustably installing the lower plurality of devices and adjustable anchoring to wall studs, the plurality of bottom fastening slots including a left bottom fastening slot for attaching the lower prefabricated unibracket single-piece frame to a left wall stud or a device and a right bottom fastening slot for attaching the lower prefabricated unibracket single-piece frame to a right wall stud or a device; a lower left frame member, the lower left frame member including a left installation hole for attaching to a left wall stud; and a lower right frame member, the lower right frame member including a right installation hole for attaching to a right wall stud; wherein the plurality of lower top fastening slots and the plurality of lower bottom fastening slots allow for adjustable placement of the lower plurality of devices along the lower prefabricated unibracket single-piece frame and for adjustable anchoring of the lower prefabricated unibracket single-piece frame to wall studs; a middle prefabricated unibracket single-piece frame being prefabricated for installation and being below in the vertical direction from the upper prefabricated unibracket single-piece frame and above in the vertical direction from the lower prefabricated unibracket single-piece frame, the middle prefabricated unibracket single-piece frame including: a middle top frame member, the middle top frame member including a plurality of middle top fastening slots along a horizontal length of the middle top frame member for adjustably installing a middle plurality of devices and adjustable anchoring to wall studs, the plurality of middle top fastening slots including a left top fastening slot for attaching the middle prefabricated unibracket single-piece frame to a left wall stud or a device and a right top fastening slot for attaching the middle prefabricated unibracket single-piece frame to a right wall stud or a device; a middle bottom frame member, the middle bottom frame member including a plurality of bottom fastening slots along a horizontal length of the middle bottom frame member for adjustably installing the middle plurality of devices and adjustable anchoring to wall studs, the plurality of bottom fastening slots including a left bottom fastening slot for attaching the middle prefabricated unibracket single-piece frame to a left wall stud or a device and a right bottom fastening slot for attaching the middle prefabricated unibracket single-piece frame to a right wall stud or a device; a middle left frame member, the middle left frame member including a left installation hole for attaching to a left wall stud; and a middle right frame member, the middle right frame member including a right installation hole for attaching to a right wall stud; wherein the plurality of middle top fastening slots and the plurality of middle bottom fastening slots allow for adjustable placement of the middle plurality of devices along the middle prefabricated unibracket single-piece frame and for adjustable anchoring of the middle prefabricated unibracket single-piece frame to wall studs.

In some aspects, the techniques described herein relate to a system, wherein a vertical distance between the upper top frame member and the lower bottom frame member is ninety-six inches.

In some aspects, the techniques described herein relate to a system, wherein the full wall prefabricated unibracket assembly system further includes backing, the backing being prefabricated and integrated with the full wall prefabricated unibracket assembly system.

In some aspects, the techniques described herein relate to a system, wherein a vertical distance between the plurality of top fastening slots and the plurality of bottom fastening slots is three and eleven sixteenths inches.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1A is a flat view of a single prefabricated unibracket assembly system according to various embodiments of the present technology.

FIG. 1B is a flat view of a double prefabricated unibracket assembly system for connecting electrical boxes in a wall according to various embodiments of the present technology.

FIG. 1C is a flat view of a wide prefabricated unibracket single-piece frame according to various embodiments of the present technology.

FIG. 4A is a flat view of a single prefabricated unibracket assembly system according to various embodiments of the present technology.

FIG. 4B is a flat view of a single prefabricated unibracket assembly system integrated with backing according to various embodiments of the present technology.

FIG. 4C is a flat view of a double prefabricated unibracket assembly system integrated with backing according to various embodiments of the present technology.

FIG. 4D is a flat view of a full wall prefabricated unibracket assembly system according 600 to various embodiments of the present technology.

FIG. 4E is a flat view of a wide prefabricated unibracket single-piece frame according to various embodiments of the present technology.

DESCRIPTION OF EXEMPLARY EMBODIMENTS

Figure 2A:
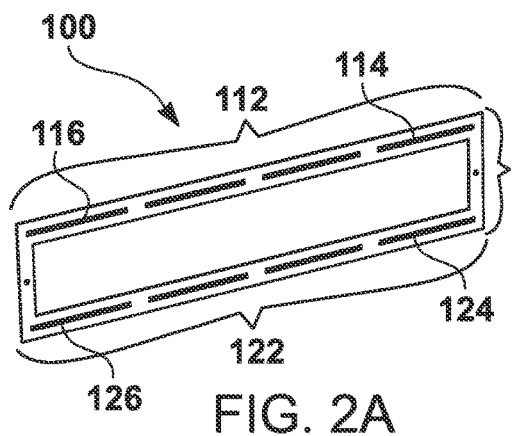
FIG. 2A is a perspective view of a single prefabricated unibracket assembly system according to various embodiments of the present technology.

Embodiments of the present disclosure are directed to prefabricated unibracket assembly systems. While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

FIG. 1A is a flat view of a single prefabricated unibracket assembly system 100 according to various embodiments of the present technology. According to various embodiments, FIG. 1A shows the single prefabricated unibracket assembly system 100 for connecting electrical boxes in a wall, the single prefabricated unibracket assembly system 100 may comprise the following elements. In various embodiments, a prefabricated unibracket single-piece frame 105 being prefabricated for installation, the prefabricated unibracket single-piece frame 105 comprising: a top frame member 110, the top frame member 110 comprising a plurality of top fastening slots 112 along a horizontal length of the top frame member 110 for adjustably installing a plurality of devices and adjustable anchoring to wall studs, the plurality of top fastening slots 112 comprising a left top fastening slot 114 for attaching the prefabricated unibracket single-piece frame 105 to a left wall stud or a device and a right top fastening slot 116 for attaching the prefabricated unibracket single-piece frame 105 to a right wall stud or a device; a bottom frame member 120, the bottom frame member 120 comprising a plurality of bottom fastening slots 122 along a horizontal length of the bottom frame member 120 for adjustably installing the plurality of devices and adjustable anchoring to wall studs, the plurality of bottom fastening slots 122 comprising a left bottom fastening slot 124 for attaching the prefabricated unibracket single-piece frame 105 to a left wall stud or a device and a right bottom fastening slot 126 for attaching the prefabricated unibracket single-piece frame 105 to a right wall stud or a device; a left frame member 130, the left frame member 130 comprising a left installation hole 135 for attaching to a left wall stud; and a right frame member 140, the right frame member 140 comprising a right installation hole 145 for attaching to a right wall stud.

In various embodiments, the plurality of top fastening slots 112 and the plurality of bottom fastening slots 122 allow for adjustable placement of the plurality of devices (e.g., a computer) along the prefabricated unibracket single-piece frame 105 and for adjustable anchoring of the prefabricated unibracket single-piece frame 105 to wall studs.

According to various embodiments standards of installation include specific dimensions for ease of installation and compatibility of existing systems and plans. In some embodiments, a vertical distance between the plurality of top fastening slots and the plurality of bottom fastening slots is three and eleven sixteenths inches. In some instances a horizontal length between each of the plurality of top fastening slots along the horizontal length of the top frame member and a horizontal length between each of the plurality of top fastening slots along the horizontal length of the top frame member is one inch.

In some embodiments the plurality of top fastening slots 112 further comprise a left middle top fastening slot 111 and a right middle top fastening slot 113; wherein the plurality of bottom fastening slots 122 further comprise a left middle bottom fastening slot 121 and a right middle bottom fastening slot 123.

In various embodiments, a vertical distance between the plurality of top fastening slots 112 and the plurality of bottom fastening slots 122 is three and eleven sixteenths inches.

In some embodiments a horizontal length between each of the plurality of top fastening slots 112 along the horizontal length of the top frame member 110 and a horizontal length between each of the plurality of bottom fastening slots 122 along the horizontal length of the bottom frame member 120 is one inch.

In various embodiments, a horizontal length of each of the plurality of top fastening slots 112 along the horizontal length of the top frame member 110 and a horizontal length of each of the plurality of top fastening slots 112 along the horizontal length of the top frame member 110 is between two inches and five inches.

In some embodiments, a horizontal length of each of the plurality of top fastening slots 112 along the horizontal length of the top frame member 110 and a horizontal length of each of the plurality of top fastening slots 112 along the horizontal length of the top frame member 110 is greater than five inches.

In various embodiments, a horizontal length of the top frame member 110 and the bottom frame member 120 is between twenty-four inches and ninety-six inches.

FIG. 1B is a flat view of a double prefabricated unibracket assembly system for connecting electrical boxes in a wall according to various embodiments of the present technology. According to various embodiments, FIG. 1B shows a double prefabricated unibracket assembly system 200 for connecting electrical boxes in a wall, the double prefabricated unibracket assembly system 200 may comprise the following elements. According to some embodiments, an upper prefabricated unibracket single-piece frame 205 being prefabricated for installation, the upper prefabricated unibracket single-piece frame 205 comprises the following elements. In various embodiments, an upper top frame member 210, the upper top frame member 210 comprises a plurality of upper top fastening slots 212 along a horizontal length of the upper top frame member 210 for adjustably installing a upper plurality of devices and adjustable anchoring to wall studs, the plurality of upper top fastening slots 212 comprising a left top fastening slot 214 for attaching the upper prefabricated unibracket single-piece frame 205 to a left wall stud or a device and a right top fastening slot 216 for attaching the upper prefabricated unibracket single-piece frame 205 to a right wall stud or a device; an upper bottom frame member 220, the upper bottom frame member 220 comprising a plurality of upper bottom fastening slots 222 along a horizontal length of the upper bottom frame member 220 for adjustably installing the upper plurality of devices and adjustable anchoring to wall studs, the plurality of upper bottom fastening slots 222 comprising a left bottom fastening slot 224 for attaching the upper prefabricated unibracket single-piece frame 205 to a left wall stud or a device and a right bottom fastening slot 226 for attaching the upper prefabricated unibracket single-piece frame 205 to a right wall stud or a device; an upper left frame member 230, the upper left frame member 230 comprising a left installation hole 235 for attaching to a left wall stud; and an upper right frame member 240, the upper right frame member comprising a right installation hole 245 for attaching to a right wall stud. In some embodiments, the plurality of upper top fastening slots 212 and the plurality of upper bottom fastening slots 222 allow for adjustable placement of the upper plurality of devices along the upper prefabricated unibracket single-piece frame 205 and for adjustable anchoring of the upper prefabricated unibracket single-piece frame 205 to wall studs.

According to various embodiments standards of installation include specific dimensions for ease of installation and compatibility of existing systems and plans. In some embodiments, a vertical distance between the upper top frame member and the lower bottom frame member is between six inches and ninety-six inches. In some embodiments the double prefabricated unibracket assembly system 200 further comprises backing, the backing being prefabricated and integrated with the unibracket single-piece frame.

According to various embodiments, FIG. 1B further shows a lower prefabricated unibracket single-piece frame 255 being prefabricated for installation and being lower in a vertical direction compared to the upper prefabricated unibracket single-piece frame 205, the lower prefabricated unibracket single-piece frame 255 may comprise the following elements. In various embodiments a lower top frame member 260, the lower top frame member 260 comprises a plurality of lower top fastening slots 262 along a horizontal length of the lower top frame member 260 for adjustably installing a lower plurality of devices and adjustable anchoring to wall studs, the plurality of lower top fastening slots 262 comprising a left top fastening slot 264 for attaching the lower prefabricated unibracket single-piece frame 255 to a left wall stud or a device and a right top fastening slot 266 for attaching the lower prefabricated unibracket single-piece frame 255 to a right wall stud or a device; a lower bottom frame member 270, the lower bottom frame member 270 comprising a plurality of lower bottom fastening slots 272 along a horizontal length of the lower bottom frame member 270 for adjustably installing the lower plurality of devices and adjustable anchoring to wall studs, the plurality of lower bottom fastening slots 272 comprising a left bottom fastening slot 274 for attaching the lower prefabricated unibracket single-piece frame 255 to a left wall stud or a device and a right bottom fastening slot 276 for attaching the lower prefabricated unibracket single-piece frame 255 to a right wall stud or a device; a lower left frame member 280, the lower left frame member 280 comprising a left installation hole 285 for attaching to a left wall stud; and a lower right frame member 290, the lower right frame member 290 comprising a right installation hole 295 for attaching to a right wall stud. In various embodiments, the plurality of lower top fastening slots 262 and the plurality of lower bottom fastening slots 272 allow for adjustable placement of the lower plurality of devices along the lower prefabricated unibracket single-piece frame 255 and for adjustable anchoring of the lower prefabricated unibracket single-piece frame 255 to wall studs.

FIG. 1C is a flat view of a wide prefabricated unibracket single-piece frame according to various embodiments of the present technology. FIG. 1C shows a flat view of the prefabricated unibracket single-piece frame is a wide frame 300, the wide frame being wherein a horizontal length of both the top frame member 310 and the bottom frame member 320 is between twenty-four inches and ninety-six inches according to some embodiments. For example, when the prefabricated unibracket single-piece frame is a wide frame 300 a plurality of devices may be installed across a multiple wall studs as shown in FIG. 3E and FIG. 3F shown below.

FIG. 2A is a perspective view of the single prefabricated unibracket assembly system 100 according to various embodiments of the present technology. For example, the plurality of top fastening slots 112 and the plurality of bottom fastening slots 122 allow for adjustable placement of the plurality of devices along the prefabricated unibracket single-piece frame 105 and for adjustable anchoring of the prefabricated unibracket single-piece frame 105 to wall studs.

Figure 2D:
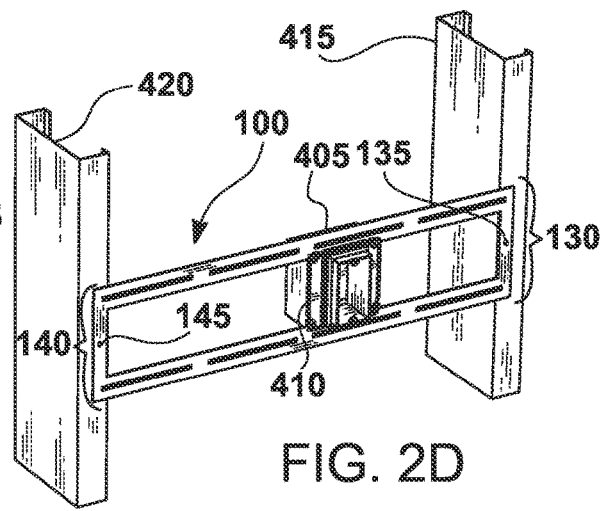
FIG. 2D is a perspective view of a single prefabricated unibracket assembly system assembled with a box and mud ring with a first installation option of a left frame member attached to a left wall stud and a right frame member attached to a right wall stud according to various embodiments of the present technology.
Figure 2B:
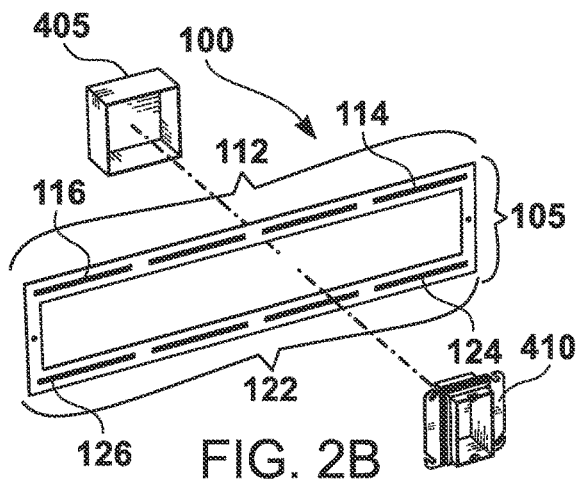
FIG. 2B is a perspective view of a single prefabricated unibracket assembly system including a box and mud ring being assembled according to various embodiments of the present technology.

FIG. 2B is a perspective view of the single prefabricated unibracket assembly system 100 including a box 405 and mud ring 410 being assembled according to various embodiments of the present technology. The box 405 is an electrical junction box (also known as a "jbox") and is an enclosure housing electrical connections. The box 405 may protect the electrical connections from the weather, as well as protect people from accidental electric shocks. The mud ring 410 is a cover for metal boxes (e.g., box 405) that allow for mounting of receptacles or switches. For example, the mud ring 410 may be installed when the box 405 is mounted before the drywall. Generally, mud rings (e.g., mud ring 410) are used in commercial construction. For example, the box 405 may be assembled by being fastened with the mud ring 410 to allow for adjustable placement of a device. FIG. 2C is a perspective view of the single prefabricated unibracket assembly system 100 assembled with the box 405 and the mud ring 410 according to various embodiments of the present technology.

Figure 2E:
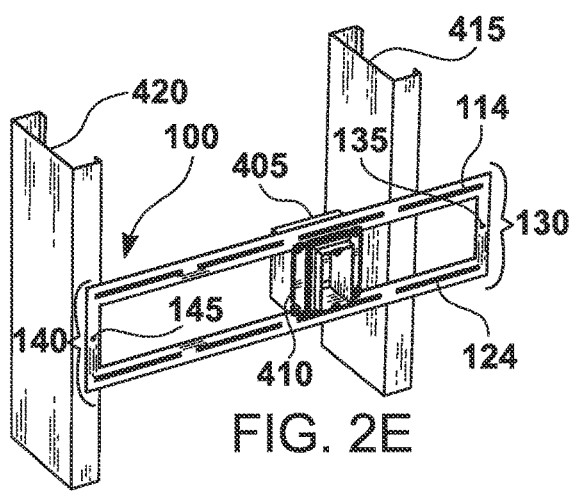
FIG. 2E is a perspective view of a single prefabricated unibracket assembly system assembled with a box and mud ring with a second installation option of a left top fastening slot and a left bottom fastening slot attaching the prefabricated unibracket single-piece frame to a left wall stud resulting in a left frame member extending beyond the left wall stud and a right frame member attached to a right wall stud according to various embodiments of the present technology.
Figure 2C:
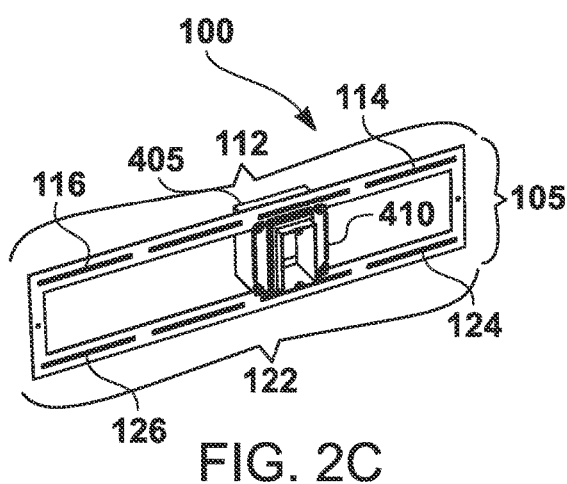
FIG. 2C is a perspective view of a single prefabricated unibracket assembly system assembled with a box and mud ring according to various embodiments of the present technology.
Figure 2F:
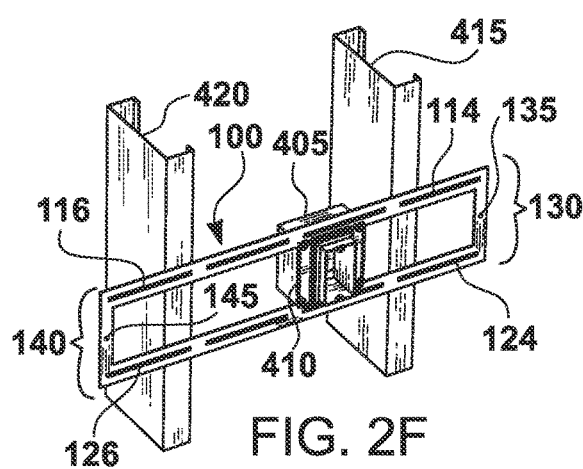
FIG. 2F is a perspective view of a single prefabricated unibracket assembly system assembled with a box and mud ring with a third installation option of a left top fastening slot and a left bottom fastening slot attaching the prefabricated unibracket single-piece frame to a left wall stud resulting in a left frame member extending beyond the left wall stud and a right top fastening slot and a right bottom fastening slot attaching the prefabricated unibracket single-piece frame to a right wall stud resulting in a right frame member extending beyond the right wall stud, according to various embodiments of the present technology.

Turning to FIG. 2D, FIG. 2E, and FIG. 2F show various installation options of the present technology. For example, the single prefabricated unibracket assembly system 100 may be installed to wall studs using a minimum number of #8½ screws as shown in FIG. 2D with the use of only two screws. Furthermore, FIG. 2E, and FIG. 2F show the single prefabricated unibracket assembly system 100 spanning multiple bays and using one screw per fastening slot (e.g. top fastening slots 112 and bottom fastening slots 122).

FIG. 2D is a perspective view of the single prefabricated unibracket assembly system 100 assembled with the box 405 and the mud ring 410 with a first installation option of the left frame member 130 attached to a left wall stud 415 and the right frame member 140 attached to a right wall stud 420 according to various embodiments of the present technology. For example, the left frame member 130 may comprise the left installation hole 135 for attaching to the left wall stud 415; and the right frame member 140 may comprise the right installation hole 145 for attaching to the right wall stud 420.

FIG. 2E is a perspective view of the single prefabricated unibracket assembly system 100 assembled with the box 405 and the mud ring 410 with a second installation option of the left top fastening slot 114 and the left bottom fastening slot 124 attaching the prefabricated unibracket single-piece frame 105 to the left wall stud 415 resulting in the left frame member 130 extending beyond the left wall stud 415 and the right frame member 140 attached to the right wall stud 420 using the right installation hole 145 for attaching the right frame member 140 to the right wall stud 420 according to various embodiments of the present technology.

FIG. 2F is a perspective view of the single prefabricated unibracket assembly system 100 assembled with the box 405 and the mud ring 410 with a third installation option of the left top fastening slot 114 and the left bottom fastening slot 124 attaching the prefabricated unibracket single-piece frame 105 to the left wall stud 415 resulting in a left frame member 130 extending beyond the left wall stud 415 and the right top fastening slot 116 and the right bottom fastening slot 126 attaching the prefabricated unibracket single-piece frame 105 to the right wall stud 420 resulting in the right frame member 140 extending beyond the right wall stud 420, according to various embodiments of the present technology.

Figure 3A:
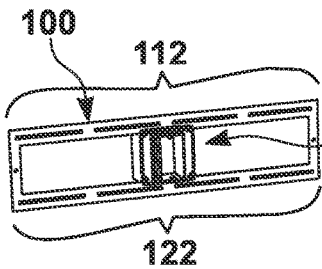
FIG. 3A is a perspective view of a single prefabricated unibracket assembly system including a single device according to various embodiments of the present technology.
Figure 3B:
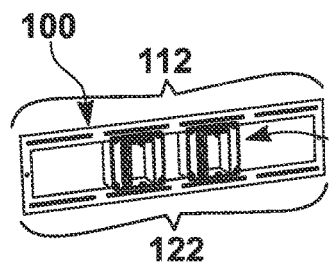
FIG. 3B is a perspective view of a single prefabricated unibracket assembly system including a double device according to various embodiments of the present technology.
Figure 3C:
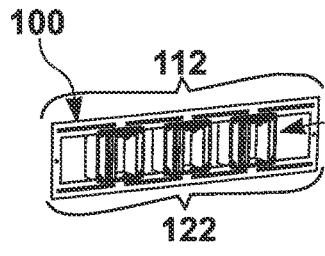
FIG. 3C is a perspective view of a single prefabricated unibracket assembly system including a triple device according to various embodiments of the present technology.
Figure 3D:
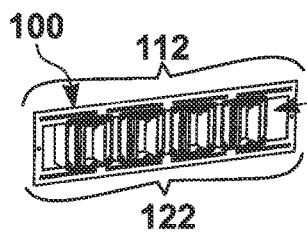
FIG. 3D is a perspective view of a single prefabricated unibracket assembly system including a quad of devices according to various embodiments of the present technology.
Figure 3E:
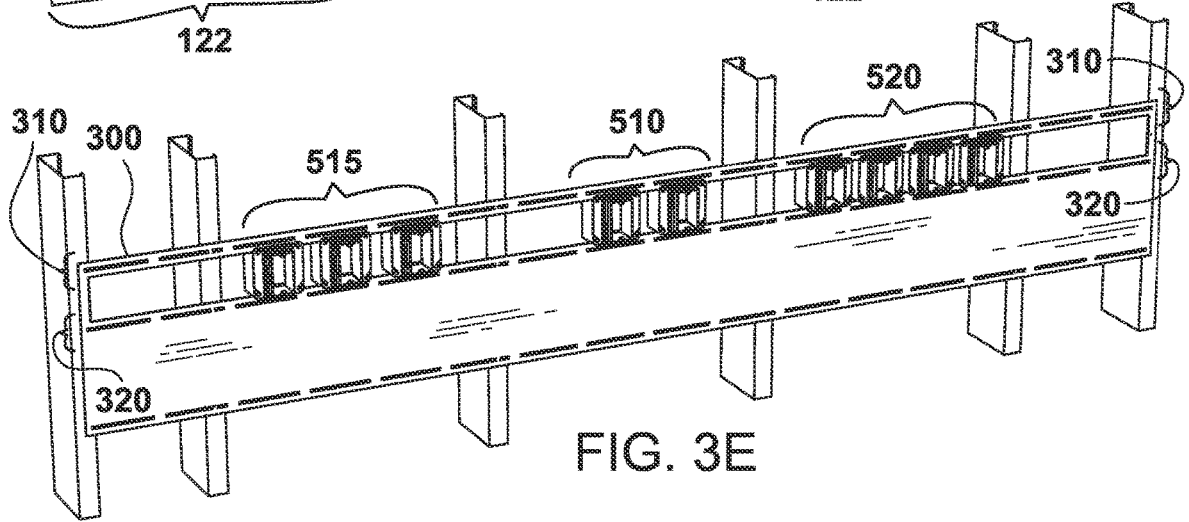
FIG. 3E is a perspective view of the prefabricated unibracket single-piece frame being a wide frame including a plurality of devices in various configurations according to various embodiments of the present technology.
Figure 3F:
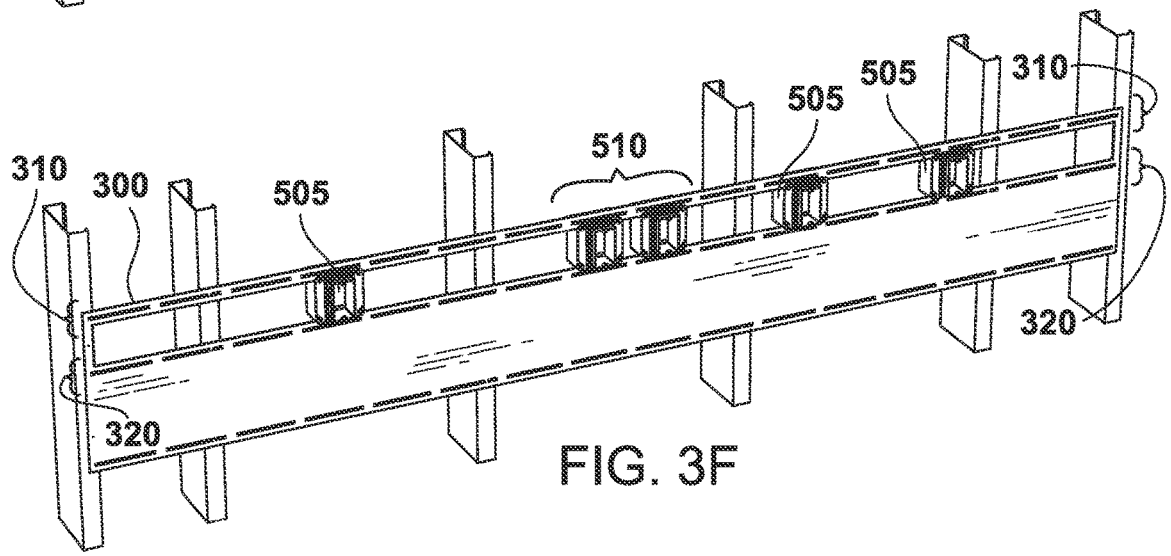
FIG. 3F is another perspective view of the prefabricated unibracket single-piece frame being a wide frame including a plurality of devices in various configurations according to various embodiments of the present technology.

Turning to FIG. 3A, FIG. 3B, FIG. 3C, and FIG. 3D show top fastening slots 112 and bottom fastening slots 122 used for installation of a plurality of devices. FIG. 3A is a perspective view of the single prefabricated unibracket assembly system 100 including a single device 505 according to various embodiments of the present technology. FIG. 3B is a perspective view of the single prefabricated unibracket assembly system 100 including a double device 510 according to various embodiments of the present technology. FIG. 3C is a perspective view of the single prefabricated unibracket assembly system 100 including a triple device 515 according to various embodiments of the present technology. FIG. 3D is a perspective view of the single prefabricated unibracket assembly system 100 including a quad of devices 520 according to various embodiments of the present technology.

FIG. 3E and FIG. 3F show a perspective view the prefabricated unibracket single-piece frame is the wide frame 300, the wide frame being wherein a horizontal length of both the top frame member 310 and the bottom frame member 320 is between twenty-four inches and ninety-six inches according to some embodiments. For example, when the prefabricated unibracket single-piece frame is a wide frame 300 a plurality of devices may be installed across multiple wall studs spanning bays between studs. For example, FIG. 3E is a perspective view of the prefabricated unibracket single-piece frame is the wide frame 300 including a plurality of devices in various configurations according to various embodiments of the present technology. For example, the double device 510 configuration, the triple device 515 configuration, and the quad of devices 520 configuration.

FIG. 3F is a perspective view of the prefabricated unibracket single-piece frame is the wide frame 300 including a plurality of devices according to various embodiments of the present technology. For example, the double device 510 configuration, and the single device 505 configuration in various positions.

FIG. 4A is a flat view of the single prefabricated unibracket assembly system 100 according to various embodiments of the present technology. FIG. 4A includes various measurements of dimensions of the single prefabricated unibracket assembly system 100 according to some embodiments.

FIG. 4B is a flat view of the single prefabricated unibracket assembly system 100 integrated with backing according to various embodiments of the present technology. FIG. 4B includes various measurements of dimensions of the single prefabricated unibracket assembly system 100 according to some embodiments. For a tall embodiment.

FIG. 4C is a flat view of a double prefabricated unibracket assembly system 200 integrated with backing according to various embodiments of the present technology. FIG. 4C includes various measurements of dimensions of the double prefabricated unibracket assembly system 200 according to some embodiments. For example, a tall embodiment.

FIG. 4D is a flat view of a full wall prefabricated unibracket assembly system 600 according to various embodiments of the present technology. FIG. 4D shows a full wall prefabricated unibracket assembly system 600 for connecting electrical boxes in a wall, the full wall prefabricated unibracket assembly system 600 comprising: an upper prefabricated unibracket single-piece frame 605 being prefabricated for installation, the upper prefabricated unibracket single-piece frame 605 comprising: an upper top frame member 610, the upper top frame member 610 comprising a plurality of upper top fastening slots 612 along a horizontal length of the upper top frame member 610 for adjustably installing a upper plurality of devices and adjustable anchoring to wall studs, the plurality of upper top fastening slots 612 comprising a left top fastening slot 614 for attaching the upper prefabricated unibracket single-piece frame 605 to a left wall stud or a device and a right top fastening slot 616 for attaching the upper prefabricated unibracket single-piece frame 605 to a right wall stud or a device. Various embodiments include an upper bottom frame member 620, the upper bottom frame member 620 comprising a plurality of upper bottom fastening slots 622 along a horizontal length of the upper bottom frame member 620 for adjustably installing the upper plurality of devices and adjustable anchoring to wall studs, the plurality of upper bottom fastening slots 622 comprising a left bottom fastening slot 624 for attaching the upper prefabricated unibracket single-piece frame 605 to a left wall stud or a device and a right bottom fastening slot 626 for attaching the upper prefabricated unibracket single-piece frame 605 to a right wall stud or a device; an upper left frame member 630, the upper left frame member 630 comprising a left installation hole 635 for attaching to a left wall stud; and an upper right frame member 640, the upper right frame member 640 comprising a right installation hole 645 for attaching to a right wall stud; wherein the plurality of upper top fastening slots 612 and the plurality of upper bottom fastening slots 622 allow for adjustable placement of the upper plurality of devices along the upper prefabricated unibracket single-piece frame 605 and for adjustable anchoring of the upper prefabricated unibracket single-piece frame 605 to wall studs.

Some embodiment include a lower prefabricated unibracket single-piece frame 655 being prefabricated for installation and being lower in a vertical direction compared to the upper prefabricated unibracket single-piece frame 605, the lower prefabricated unibracket single-piece frame 655 comprising: a lower top frame member 660, the lower top frame member 660 comprising a plurality of lower top fastening slots 662 along a horizontal length of the lower top frame member 660 for adjustably installing a lower plurality of devices and adjustable anchoring to wall studs, the plurality of lower top fastening slots 662 comprising a left top fastening slot 614 for attaching the lower prefabricated unibracket single-piece frame 655 to a left wall stud or a device and a right top fastening slot 616 for attaching the lower prefabricated unibracket single-piece frame 655 to a right wall stud or a device; a lower bottom frame member 670, the lower bottom frame member 670 comprising a plurality of bottom fastening slots 672 along a horizontal length of the lower bottom frame member 670 for adjustably installing the lower plurality of devices and adjustable anchoring to wall studs, the plurality of bottom fastening slots 672 comprising a left bottom fastening slot 624 for attaching the lower prefabricated unibracket single-piece frame 655 to a left wall stud or a device and a right bottom fastening slot 626 for attaching the lower prefabricated unibracket single-piece frame 655 to a right wall stud or a device; a lower left frame member 680, the lower left frame member 680 comprising a left installation hole for attaching to a left wall stud; and a lower right frame member 690, the lower right frame member 690 comprising a right installation hole for attaching to a right wall stud; wherein the plurality of lower top fastening slots 662 and the plurality of lower bottom fastening slots allow for adjustable placement of the lower plurality of devices along the lower prefabricated unibracket single-piece frame 655 and for adjustable anchoring of the lower prefabricated unibracket single-piece frame 655 to wall studs;

Some embodiments include a middle prefabricated unibracket single-piece frame 755 being prefabricated for installation and being below in the vertical direction from the upper prefabricated unibracket single-piece frame 605 and above in the vertical direction from the lower prefabricated unibracket single-piece frame 655, the middle prefabricated unibracket single-piece frame 755 comprising: a middle top frame member 760, the middle top frame member 760 comprising a plurality of middle top fastening slots 762 along a horizontal length of the middle top frame member 760 for adjustably installing a middle plurality of devices and adjustable anchoring to wall studs, the plurality of middle top fastening slots 762 comprising a left top fastening slot 614 for attaching the middle prefabricated unibracket single-piece frame 755 to a left wall stud or a device and a right top fastening slot 616 for attaching the middle prefabricated unibracket single-piece frame 755 to a right wall stud or a device; a middle bottom frame member 770, the middle bottom frame member 770 comprising a plurality of middle bottom fastening slots 772 along a horizontal length of the middle bottom frame member 770 for adjustably installing the middle plurality of devices and adjustable anchoring to wall studs, the plurality of middle bottom fastening slots 772 comprising a left bottom fastening slot 624 for attaching the middle prefabricated unibracket single-piece frame 755 to a left wall stud or a device and a right bottom fastening slot 626 for attaching the middle prefabricated unibracket single-piece frame 755 to a right wall stud or a device; a middle left frame member 780, the middle left frame member 780 comprising a left installation hole for attaching to a left wall stud; and a middle right frame member 790, the middle right frame member 790 comprising a right installation hole for attaching to a right wall stud; wherein the plurality of middle top fastening slots 762 and the plurality of middle bottom fastening slots allow for adjustable placement of the middle plurality of devices along the middle prefabricated unibracket single-piece frame 755 and for adjustable anchoring of the middle prefabricated unibracket single-piece frame 755 to wall studs.

According to various embodiments standards of installation include specific dimensions for ease of installation and compatibility of existing systems and plans. In some embodiments, a vertical distance between the upper top frame member 610 and the lower bottom frame member 670 is ninety-six inches. In various instances the full wall prefabricated unibracket assembly system 600 further comprises backing, the backing being prefabricated and integrated with the full wall prefabricated unibracket assembly system. In various embodiments a vertical distance between the plurality of top fastening slots and the plurality of bottom fastening slots 672 is three and eleven sixteenths inches.

FIG. 4E is a flat view of a wide prefabricated unibracket single-piece frame according to various embodiments of the present technology. FIG. 4E includes various measurements of dimensions of the prefabricated unibracket single-piece frame is the wide frame 300 according to some embodiments.

Figure 5A:
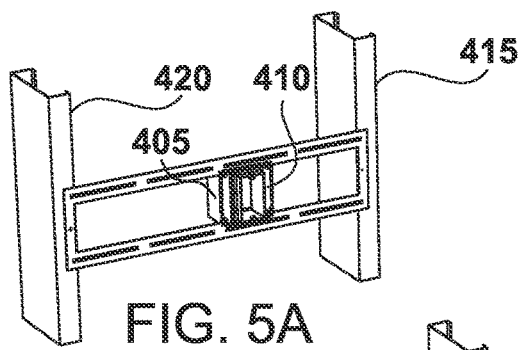
FIG. 5A is a perspective view of a single prefabricated unibracket assembly system assembled with a box and mud ring with an installation option of a left frame member attached to a left wall stud and a right frame member attached to a right wall stud according to various embodiments of the present technology.

FIG. 5A is a perspective view of the single prefabricated unibracket assembly system 100 assembled with the box 405 and the mud ring 410 with an installation option of a left frame member attached to the left wall stud 415 and a right frame member attached to the right wall stud 420 according to various embodiments of the present technology.

Figure 5B:
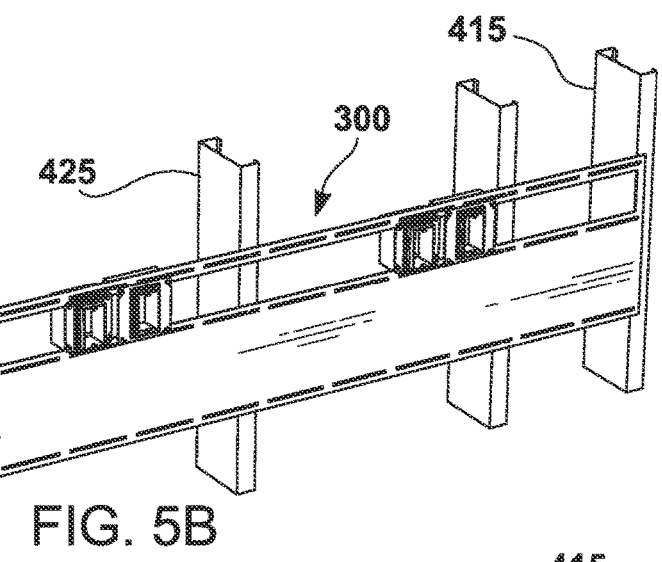
FIG. 5B a perspective view of a wide prefabricated unibracket single-piece frame integrated with backing and with a plurality of devices and an installation option of a left frame member attached to a left wall stud and a right frame member attached to a right wall stud according to various embodiments of the present technology.

FIG. 5B a perspective view of a prefabricated unibracket single-piece frame integrated system is the wide frame 300 with backing and with a plurality of devices and an installation option of a left frame member attached to the left wall stud 415 and a right frame member attached to the right wall stud 420 according to various embodiments of the present technology.

In various embodiments the prefabricated unibracket single-piece frame is a wide frame, the wide frame being wherein a horizontal length of both the top frame member 110 and the bottom frame member 120 is between twenty-four inches and ninety-six inches. In some instances, at least one of the plurality of top fastening slots 112 are anchored to a middle wall anchor 425, the middle wall anchor 425 being between the left wall stud 415 and the right wall stud 420. In some embodiments, at least one of the plurality of bottom fastening slots 122 are anchored to the middle wall anchor 425, the middle wall anchor 425 being between the left wall stud 415 and the right wall stud 420.

Figure 5C:
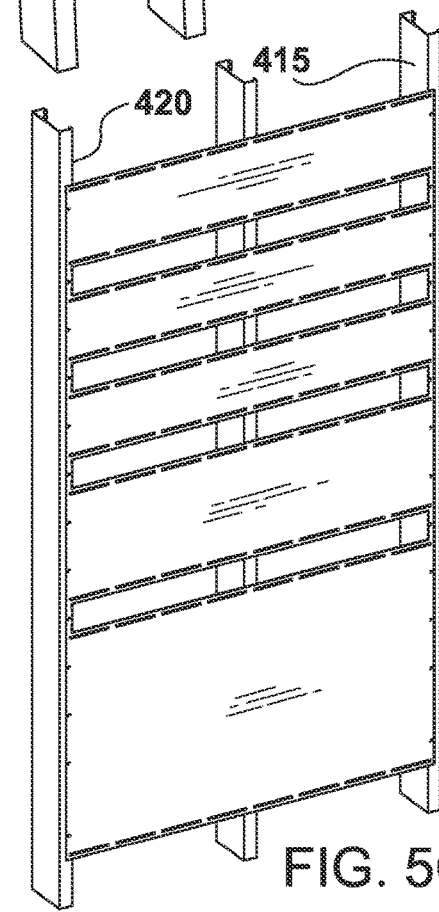
FIG. 5C a perspective view of a full wall prefabricated unibracket assembly system integrated with backing and an installation option of a left frame member attached to a left wall stud and a right frame member attached to a right wall stud according to various embodiments of the present technology.

FIG. 5C a perspective view of a full wall prefabricated unibracket assembly system integrated with backing and an installation option of a left frame member attached to the left wall stud 415 and a right frame member attached to the right wall stud 420 according to various embodiments of the present technology.

Figure 5D:
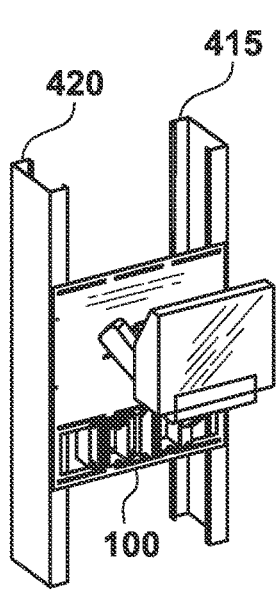
FIG. 5D is a perspective view of a single prefabricated unibracket assembly system integrated with backing according to various embodiments of the present technology.

FIG. 5D is a perspective view of the single prefabricated unibracket assembly system 100 integrated with backing according to various embodiments of the present technology and an installation option of a left frame member attached to the left wall stud 415 and a right frame member attached to the right wall stud 420 and a device (e.g., computer) installed, according to various embodiments of the present technology.

Figure 5E:
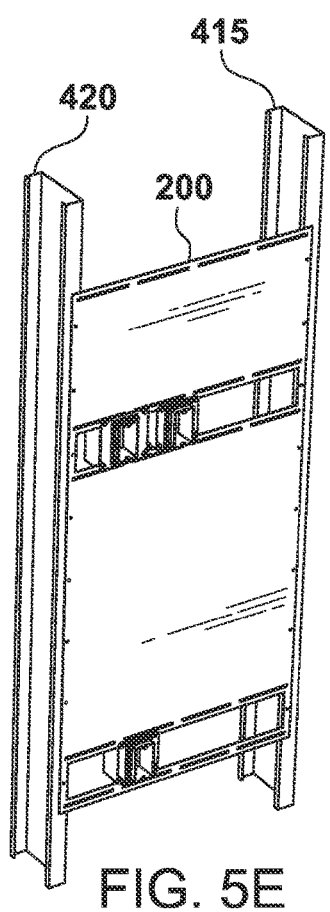
FIG. 5E is a perspective view of a double prefabricated unibracket assembly system integrated with backing according to various embodiments of the present technology.

FIG. 5E is a perspective view of a double prefabricated unibracket assembly system 200 integrated with backing with an installation option of a left frame member attached to the left wall stud 415 and a right frame member attached to the right wall stud 420 according to various embodiments of the present technology.

Figure 6:
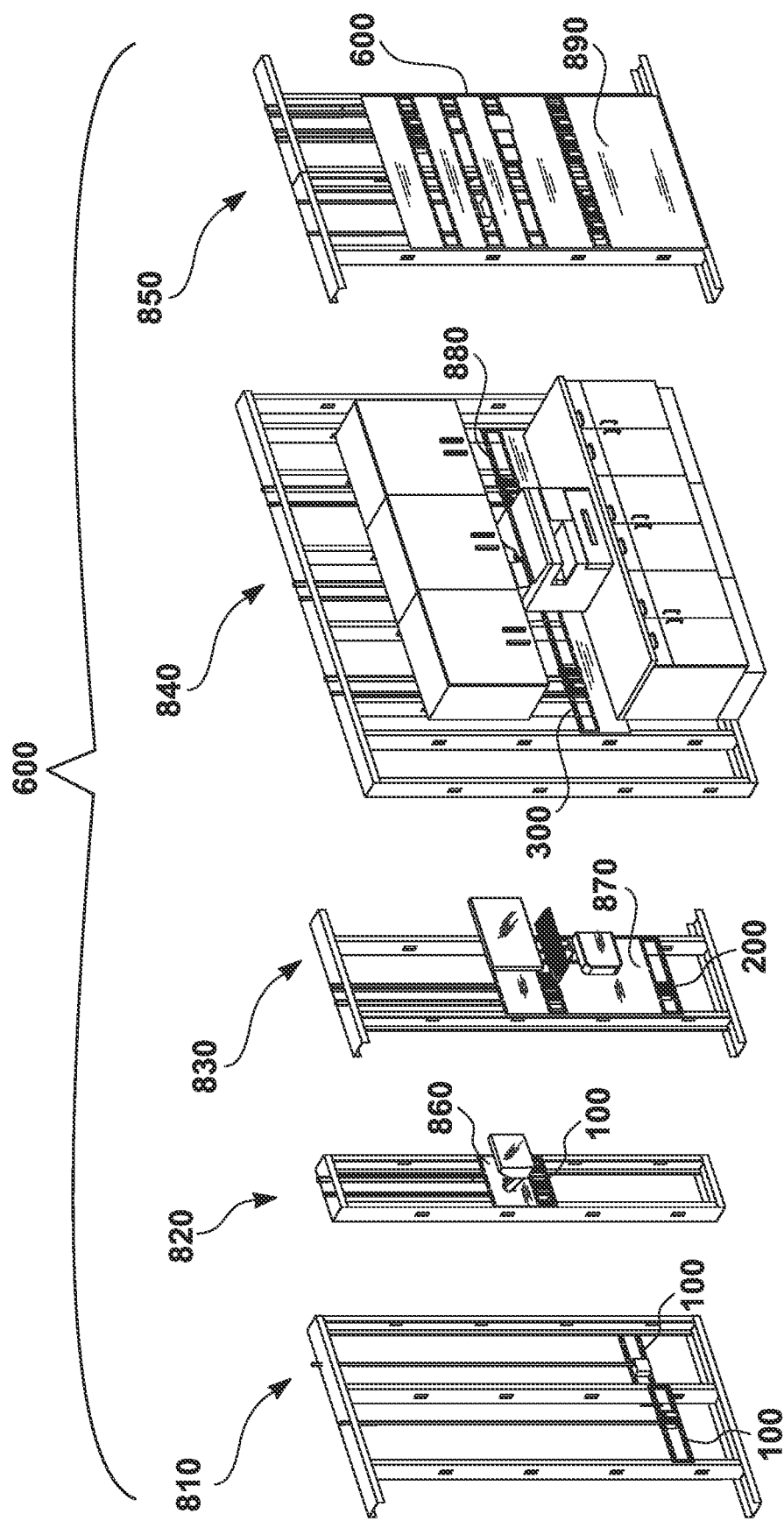
FIG. 6 are illustrations of in use views of prefabricated unibracket assembly systems according to various embodiments of the present technology.

FIG. 6 are illustrations of in use views of prefabricated unibracket assembly systems according to various embodiments of the present technology. Illustration 810 shows examples of a single prefabricated unibracket assembly system 100 in use. Illustration 820 shows examples of a single prefabricated unibracket assembly system 100 in use including integrated backing 860 including an installed device (e.g., a computer). Illustration 830 shows the double prefabricated unibracket assembly system 200 in use including integration with backing 870. Illustration 840 shows the prefabricated unibracket single-piece frame that is a wide frame 300 with integration with backing 880. Illustration 850 shows a full wall prefabricated unibracket assembly system 600 with integration with backing 890.

Figure 7:
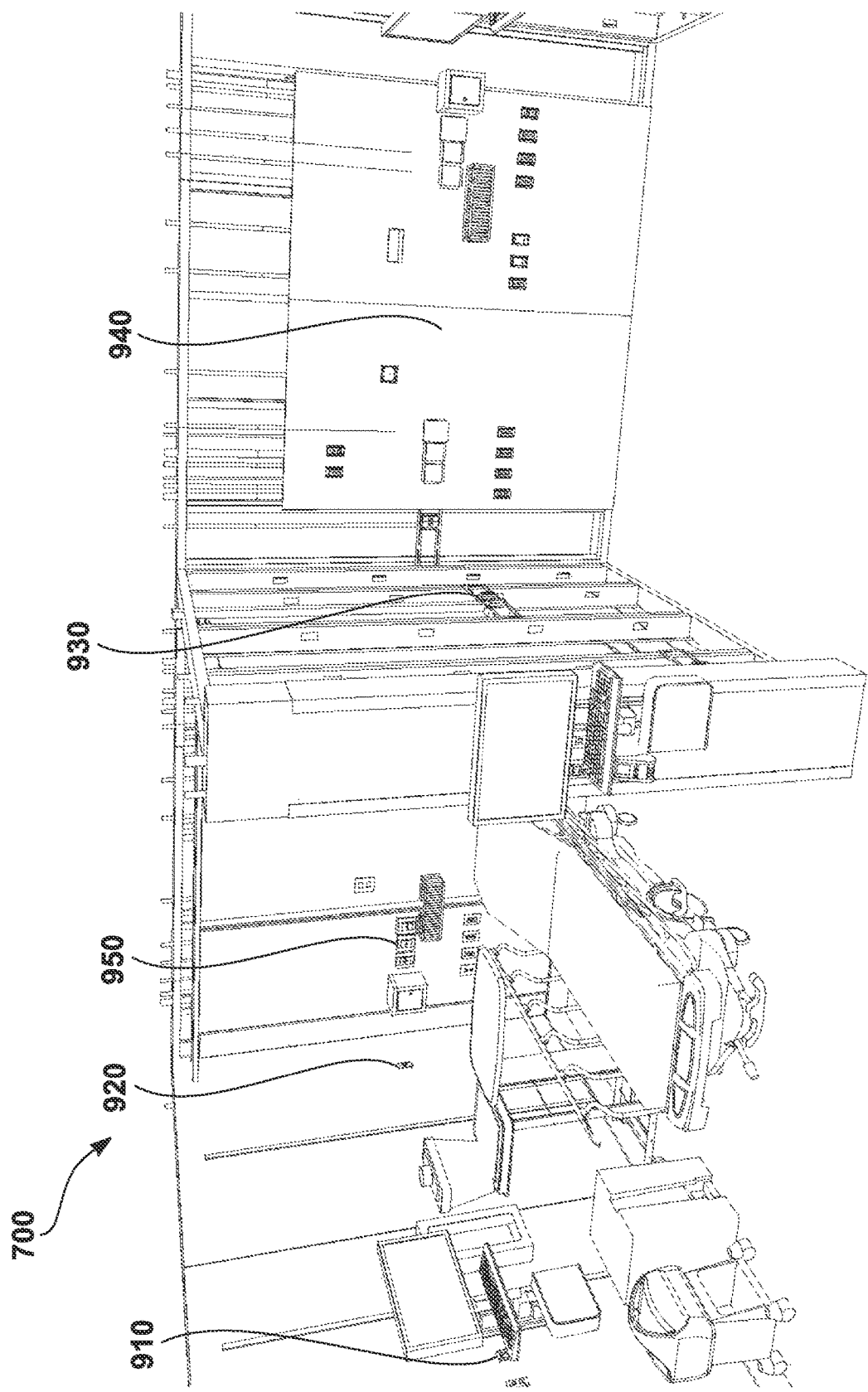
FIG. 7 are illustrations of use views of prefabricated unibracket assembly systems according to various embodiments of the present technology.

FIG. 7 are illustrations of use views 700 of prefabricated unibracket assembly systems according to various embodiments of the present technology. Illustration 910 shows a use of the double prefabricated unibracket assembly system 200 (in use) including integration with backing 870 (in use). Illustration 920 shows a use of a single prefabricated unibracket assembly system 100. Illustration 930 shows another use of a single prefabricated unibracket assembly system 100 (in use). Illustration 940 shows a full wall prefabricated unibracket assembly system 600 (in use) with integration with backing 890. Illustration 950 shows another use of the double prefabricated unibracket assembly system 200 (in use) including integration with backing 870 according to some configurations.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three-dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A single prefabricated unibracket assembly system for connecting electrical boxes in a wall, the single prefabricated unibracket assembly system comprising:
    a prefabricated unibracket single-piece frame being prefabricated for installation, the prefabricated unibracket single-piece frame comprising:
        a top frame member, the top frame member comprising a plurality of top fastening slots along a horizontal length of the top frame member for adjustably installing a plurality of devices and adjustable anchoring to wall studs, the plurality of top fastening slots comprising a left top fastening slot for attaching the prefabricated unibracket single-piece frame to a left wall stud or a device and a right top fastening slot for attaching the prefabricated unibracket single-piece frame to a right wall stud or the device;
        a bottom frame member, the bottom frame member comprising a plurality of bottom fastening slots along a horizontal length of the bottom frame member for adjustably installing the plurality of devices and adjustable anchoring to the wall studs, the plurality of bottom fastening slots comprising a left bottom fastening slot for attaching the prefabricated unibracket single-piece frame to the left wall stud or the device and a right bottom fastening slot for attaching the prefabricated unibracket single-piece frame to the right wall stud or the device;
        a left frame member, the left frame member comprising a left installation hole for attaching to the left wall stud; and
        a right frame member, the right frame member comprising a right installation hole for attaching to the right wall stud;
    wherein the plurality of top fastening slots and the plurality of bottom fastening slots allow for adjustable placement of the plurality of devices along the prefabricated unibracket single-piece frame and for adjustable anchoring of the prefabricated unibracket single-piece frame at different points along its length to the wall studs, and
    wherein the prefabricated unibracket single-piece frame is configured to lie entirely in a two-dimensional plane thereby facilitating a horizontal translation of the single prefabricated unibracket assembly system to accommodate anchoring the single prefabricated unibracket assembly system to the wall studs having different wall stud spacings.

2. The system of claim 1,
    wherein the plurality of top fastening slots further comprise a left middle top fastening slot and a right middle top fastening slot; and
    wherein the plurality of bottom fastening slots further comprise a left middle bottom fastening slot and a right middle bottom fastening slot.

3. The system of claim 1, wherein a vertical distance between the plurality of top fastening slots and the plurality of bottom fastening slots is three and eleven sixteenths inches.

4. The system of claim 1, wherein a horizontal length between each of the plurality of top fastening slots along the horizontal length of the top frame member and a horizontal length between each of the plurality of bottom fastening slots along the horizontal length of the bottom frame member is one inch.

5. The system of claim 1, wherein a horizontal length of each of the plurality of top fastening slots along the horizontal length of the top frame member and a horizontal length of each of the plurality of bottom fastening slots along the horizontal length of the bottom frame member is between two inches and five inches.

6. The system of claim 1, wherein a horizontal length of each of the plurality of top fastening slots along the horizontal length of the top frame member and a horizontal length of each of the plurality of top fastening slots along the horizontal length of the top frame member is greater than five inches.

7. The system of claim 1, wherein the horizontal length of the top frame member and the horizontal length of the bottom frame member are between twenty-four inches and ninety-six inches.

8. The system of claim 1,
    wherein the prefabricated unibracket single-piece frame is a wide frame, and wherein the horizontal length of the top frame member and horizontal length of the bottom frame member are between twenty-four inches and ninety-six inches.

9. The system of claim 8,
    wherein at least one of the plurality of top fastening slots is anchored to a middle wall anchor, the middle wall anchor being between the left wall stud and the right wall stud; and
    wherein at least one of the plurality of bottom fastening slots is anchored to the middle wall anchor, the middle wall anchor being between the left wall stud and the right wall stud.

10. The system of claim 1, wherein the plurality of devices comprises two devices.

11. The system of claim 1, wherein the plurality of devices comprises three devices.

12. The system of claim 1, wherein the plurality of devices comprises four devices.

13. The system of claim 1, wherein the prefabricated unibracket single-piece frame further comprises backing, the backing being prefabricated and integrated with the prefabricated unibracket single-piece frame.

14. A double prefabricated unibracket assembly system for connecting electrical boxes in a wall, the double prefabricated unibracket assembly system comprising:
    an upper prefabricated unibracket single-piece frame being prefabricated for installation, the upper prefabricated unibracket single-piece frame comprising:

an upper top frame member, the upper top frame member comprising a plurality of upper top fastening slots along a horizontal length of the upper top frame member for adjustably installing an upper plurality of devices and adjustable anchoring to wall studs, the plurality of upper top fastening slots comprising a left top fastening slot for attaching the upper prefabricated unibracket single-piece frame to a left wall stud or a device and a right top fastening slot for attaching the upper prefabricated unibracket single-piece frame to a right wall stud or the device;

an upper bottom frame member, the upper bottom frame member comprising a plurality of upper bottom fastening slots along a horizontal length of the upper bottom frame member for adjustably installing the upper plurality of devices and adjustable anchoring to the wall studs, the plurality of upper bottom fastening slots comprising a left bottom fastening slot for attaching the upper prefabricated unibracket single-piece frame to the left wall stud or the device and a right bottom fastening slot for attaching the upper prefabricated unibracket single-piece frame to the right wall stud or the device;

an upper left frame member, the upper left frame member comprising a left installation hole for attaching to the left wall stud; and an upper right frame member, the upper right frame member comprising a right installation hole for attaching to the right wall stud;

wherein the plurality of upper top fastening slots and the plurality of upper bottom fastening slots allow for adjustable placement of the upper plurality of devices along the upper prefabricated unibracket single-piece frame and for adjustable anchoring of the upper prefabricated unibracket single-piece frame at different points along its length to the wall studs; and a lower prefabricated unibracket single-piece frame being prefabricated for installation and being lower in a vertical direction compared to the upper prefabricated unibracket single-piece frame, the lower prefabricated unibracket single-piece frame comprising:

a lower top frame member, the lower top frame member comprising a plurality of lower top fastening slots along a horizontal length of the lower top frame member for adjustably installing a lower plurality of devices and adjustable anchoring to the wall studs, the plurality of lower top fastening slots comprising a left top fastening slot for attaching the lower prefabricated unibracket single-piece frame to the left wall stud or the device and a right top fastening slot for attaching the lower prefabricated unibracket single-piece frame to the right wall stud or the device;

a lower bottom frame member, the lower bottom frame member comprising a plurality of lower bottom fastening slots along a horizontal length of the lower bottom frame member for adjustably installing the lower plurality of devices and adjustable anchoring to the wall studs, the plurality of lower bottom fastening slots comprising a left bottom fastening slot for attaching the lower prefabricated unibracket single-piece frame to the left wall stud or the device and a right bottom fastening slot for attaching the lower prefabricated unibracket single-piece frame to the right wall stud or the device;

a lower left frame member, the lower left frame member comprising a left installation hole for attaching to the left wall stud; and a lower right frame member, the lower right frame member comprising a right installation hole for attaching to the right wall stud;

wherein the plurality of lower top fastening slots and the plurality of lower bottom fastening slots allow for adjustable placement of the lower plurality of devices along the lower prefabricated unibracket single-piece frame and for adjustable anchoring of the lower prefabricated unibracket single-piece frame at different points along its length to the wall studs, and wherein the upper prefabricated unibracket single-piece frame and the lower prefabricated unibracket single-piece frame are configured to lie entirely in a two-dimensional plane thereby facilitating a horizontal translation of the double prefabricated unibracket assembly system to accommodate anchoring the double prefabricated unibracket assembly system to the wall studs having different wall stud spacings.

15. The system of claim 14, wherein a vertical distance between the upper top frame member and the lower bottom frame member is between six inches and ninety-six inches.

16. The system of claim 14, wherein the double prefabricated unibracket assembly system further comprises backing, the backing being prefabricated and integrated with the prefabricated unibracket single-piece frame.

17. A full wall prefabricated unibracket assembly system for connecting electrical boxes in a wall, the full wall prefabricated unibracket assembly system comprising:

an upper prefabricated unibracket single-piece frame being prefabricated for installation, the upper prefabricated unibracket single-piece frame comprising:

an upper top frame member, the upper top frame member comprising a plurality of upper top fastening slots along a horizontal length of the upper top frame member for adjustably installing an upper plurality of devices and adjustable anchoring to the wall studs, the plurality of upper top fastening slots comprising a left top fastening slot for attaching the upper prefabricated unibracket single-piece frame to a left wall stud or a device and a right top fastening slot for attaching the upper prefabricated unibracket single-piece frame to a right wall stud or the device;

an upper bottom frame member, the upper bottom frame member comprising a plurality of upper bottom fastening slots along a horizontal length of the upper bottom frame member for adjustably installing the upper plurality of devices and adjustable anchoring to wall studs, the plurality of upper bottom fastening slots comprising a left bottom fastening slot for attaching the upper prefabricated unibracket single-piece frame to the left wall stud or the device and a right bottom fastening slot for attaching the upper prefabricated unibracket single-piece frame to the right wall stud or the device;

an upper left frame member, the upper left frame member comprising a left installation hole for attaching to the left wall stud; and an upper right frame member, the upper right frame member comprising a right installation hole for attaching to the right wall stud;

wherein the plurality of upper top fastening slots and the plurality of upper bottom fastening slots allow for adjustable placement of the upper plurality of devices along the upper prefabricated unibracket single-piece frame and for adjustable anchoring of the upper prefabricated unibracket single-piece frame at different points along its length to the wall studs;

a lower prefabricated unibracket single-piece frame being prefabricated for installation and being lower in a vertical direction compared to the upper prefabricated unibracket single-piece frame, the lower prefabricated unibracket single-piece frame comprising:

a lower top frame member, the lower top frame member comprising a plurality of lower top fastening slots along a horizontal length of the lower top frame member for adjustably installing a lower plurality of devices and adjustable anchoring to the wall studs, the plurality of lower top fastening slots comprising a left top fastening slot for attaching the lower prefabricated unibracket single-piece frame to the left wall stud or the device and a right top fastening slot for attaching the lower prefabricated unibracket single-piece frame to the right wall stud or the device;

a lower bottom frame member, the lower bottom frame member comprising a plurality of lower bottom fastening slots along a horizontal length of the lower bottom frame member for adjustably installing the lower plurality of devices and adjustable anchoring to the wall studs, the plurality of lower bottom fastening slots comprising a left bottom fastening slot for attaching the lower prefabricated unibracket single-piece frame to the left wall stud or the device and a right bottom fastening slot for attaching the lower prefabricated unibracket single-piece frame to the right wall stud or the device;

a lower left frame member, the lower left frame member comprising a left installation hole for attaching to the left wall stud; and a lower right frame member, the lower right frame member comprising a right installation hole for attaching to the right wall stud;

wherein the plurality of lower top fastening slots and the plurality of lower bottom fastening slots allow for adjustable placement of the lower plurality of devices along the lower prefabricated unibracket single-piece frame and for adjustable anchoring of the lower prefabricated unibracket single-piece frame at different points along its length to the wall studs; and a middle prefabricated unibracket single-piece frame being prefabricated for installation and being below in the vertical direction from the upper prefabricated unibracket single-piece frame and above in the vertical direction from the lower prefabricated unibracket single-piece frame, the middle prefabricated unibracket single-piece frame comprising:

a middle top frame member, the middle top frame member comprising a plurality of middle top fastening slots along a horizontal length of the middle top frame member for adjustably installing a middle plurality of devices and adjustable anchoring to the wall studs, the plurality of middle top fastening slots comprising a left top fastening slot for attaching the middle prefabricated unibracket single-piece frame to the left wall stud or the device and a right top fastening slot for attaching the middle prefabricated unibracket single-piece frame to the right wall stud or the device;

a middle bottom frame member, the middle bottom frame member comprising a plurality of middle bottom fastening slots along a horizontal length of the middle bottom frame member for adjustably installing the middle plurality of devices and adjustable anchoring to the wall studs, the plurality of middle bottom fastening slots comprising a left bottom fastening slot for attaching the middle prefabricated unibracket single-piece frame to the left wall stud or the device and a right bottom fastening slot for attaching the middle prefabricated unibracket single-piece frame to the right wall stud or the device;

a middle left frame member, the middle left frame member comprising a left installation hole for attaching to the left wall stud; and a middle right frame member, the middle right frame member comprising a right installation hole for attaching to the right wall stud;

wherein the plurality of middle top fastening slots and the plurality of middle bottom fastening slots allow for adjustable placement of the middle plurality of devices along the middle prefabricated unibracket single-piece frame and for adjustable anchoring of the middle prefabricated unibracket single-piece frame at different points along its length to the wall studs and wherein the upper prefabricated unibracket single-piece frame, the middle prefabricated unibracket single-piece frame and the lower prefabricated unibracket single-piece frame are configured to lie entirely in a two-dimensional plane thereby facilitating a horizontal translation of the full wall prefabricated unibracket assembly system to accommodate anchoring the full wall prefabricated unibracket assembly system to the wall studs having different wall stud spacings.

18. The system of claim 17, wherein a vertical distance between the upper top frame member and the lower bottom frame member is ninety-six inches.

19. The system of claim 17, wherein the full wall prefabricated unibracket assembly system further comprises backing, the backing being prefabricated and integrated with the full wall prefabricated unibracket assembly system.

20. The system of claim 17, wherein a vertical distance between the plurality of upper top fastening slots and the plurality of upper bottom fastening slots is three and eleven sixteenths inches.

* * * * *